Patented Oct. 25, 1938

2,134,504

UNITED STATES PATENT OFFICE 2,134,504

COMBATING INSECTS

Karl Brodersen and Matthias Quaedvlieg, Dessau in Anhalt, Germany, assignors to Winthrop Chemical Company, Inc., New York, N. Y., a corporation of New York No Drawing. Application June 23, 1936, Serial No. 86,821. In Germany November 30, 1932

9 Claims. (Cl. 167—22)

Our present invention relates to new improved insecticides and to a new process of destroying pests. It is a continuation-in-part of our copending application Serial No. 694,685, filed October 21, 1933.

For destroying pests of all kinds a large number of organic compounds has been used, for instance ethers, esters, alkylene-oxides, aldehydes, ketones, acid amides, amines, sulfides or mercaptans. These compounds have been brought into action in gaseous form and for this purpose apparatus of one sort or another has been necessary in particular evaporators or cloud-producers, so that the mere introduction of the destructive agent into the room to be treated does not suffice.

In the case of very volatile agents of this kind, difficulties arise during transport, particularly in hot climates, and in these cases the agents have to be supplied in steel bottles. This in itself is a disadvantage, because the liquefied substance absorbs much heat during its volatilization, so that the speed of evaporation diminishes and a constant rate of evaporation of the agent presents difficulty. The problem to be solved is how to obtain rapid and complete evaporation in order that the effective concentration of the vaporized agent in the atmosphere may be achieved as quickly as possible.

The present invention overcomes the several difficulties inherent to the use of agents of this kind by using aliphatic esters of formic acid in the form of an addition compound with an inorganic salt. Such compounds decompose with spontaneous heating and yield the destructive agent in the form of vapor by action of water. This decomposition and evolution of the vapor may be secured by adding water to the addition compound; on the other hand, the atmospheric moisture, moisture in the soil or moisture adhering to the goods to be treated, may be used for liberating the active agent from the addition compound.

Addition compounds of the kind in question are, for instance, those of methyl formate, ethyl formate, propyl formate, butyl formate, or other esters of formic acid having a boiling point not higher than about 150° C. and having a low vapor tension at ordinary temperature, with magnesium chloride or calcium chloride. These addition compounds are obtainable easily and in good yield by treatment of the anhydrous salt (magnesium or calcium chloride) with the esters of formic acid in question. Thus, for instance, anhydrous magnesium chloride in a finely pulverized state and being free from hydroxy chloride as far as possible, is treated in a ball mill with vaporized methyl formate under exclusion of water or moisture. The temperature which slightly raises during the formation of the double compound, is kept at about 30 to 35° C. and this treatment is continued until about 2 mols of the ester are taken up by the magnesium chloride. It corresponds to the formula $MgCl_2 \cdot 2HCOOCH_3$. The addition compounds of other formic esters with magnesium chloride or calcium chloride respectively, are produced in an analogous manner. They form crystallized compounds and may, in contrast with the liquid insecticides, be packed in simple sheet metal boxes, in which they can be exported and preserved for practically an unlimited time. They may be used in definite doses more easily than is possible with the liquid or gaseous agents.

It is advantageous in some circumstances to use the double compound in admixture with a neutralizing agent, such as chalk or magnesia; or with a diluent, such as talc or bolus. In particular cases, for example, for destroying underground pests, manurial constituents may also be added. Other known solid agents having an insecticidal or bactericidal action, such as para-dichlorobenzene, naphthalene, camphor or para-formaldehyde, may be used in conjunction with the addition compound according to this invention.

These agents can be used, for example, for destroying weevil in barns, elevators or silos. Also the pests in foods and fodders, for instance the pea- and lentil-beetles, or in leguminous vegetables. The process is not limited to its application to corn or the like; it may be applied equally well for destroying vermin in skins, clothing, rags or the like; also for exterminating mice or moles from their burrows in agricultural soil.

The atmospheric moisture suffices to decompose the addition compound of the formic acid ester and the said inorganic salts so as to volatilize the former in the enclosed space. For example, for securing a long sustained concentration of vapor of the destroying agent in a small closed chamber, such as a dwelling room, a cupboard or a museum case, the addition compound to be used may be placed in an open dish so that the natural or, if desired, artificially increased content of moisture in the air may decompose the compound with evaporation of the destroying agent.

In the case of destroying pests in loosely lying material, for example in wheat or pulse, even in very large stores it suffices to distribute the addition compound in the goods to be treated. The moisture adhering to the goods suffices to liberate the effective agent from the compound.

The following examples illustrate the invention:

*Example 1.*—A bin of about 1 cubic meter capacity is charged with 15 centners of corn strongly infected with weevil. At the same time 600 to 800 grams of a compound of calcium chloride with methyl formate having a content of about 40 to 50 per cent. of the latter is intermingled with the corn. After 24 hours every weevil is found to have been killed.

*Example 2.*—100 parts by weight of an addition compound made from methyl formate and anhydrous magnesium chloride and containing about 50 per cent. of methyl formate is covered with 100 to 200 parts of water. This mixture appears to boil and the whole of the methyl formate in it is expelled in the form of gas.

It is obvious that our invention is not limited to the examples given above or to the specific details given therein, and, for instance, other addition compounds of the kind described and containing a formic acid ester and either magnesium chloride or calcium chloride may be used instead of the methyl formate-magnesium chloride or -calcium chloride.

What we claim is:

1. A solid insecticide comprising an addition compound of an alkyl ester of formic acid having a boiling point not higher than 150° C. with an anhydrous alkaline earth metal chloride of the group consisting of magnesium and calcium chloride, which double compound is decomposed by the action of water or moisture.

2. A solid insecticide comprising an addition compound of methylformate with an anhydrous alkaline earth metal chloride of the group consisting of magnesium chloride and calcium chloride, which double compound is decomposed by the action of water or moisture.

3. A solid insecticide comprising the addition compound of methylformate with anhydrous magnesium chloride corresponding to the formula $MgCl_2 \cdot 2HCOOCH_3$, which double compound is decomposed by the action of water or moisture.

4. A solid insecticide comprising the addition compound of methylformate with anhydrous calcium chloride corresponding to the formula $CaCl_2 \cdot 2HCOOCH_3$, which double compound is decomposed by the action of water or moisture.

5. The process for combating pests in enclosed spaces which comprises introducing into the closed space a preparation containing an addition compound of an alkyl ester of formic acid having a boiling point not higher than 150° C. with an anhydrous alkaline earth metal chloride of the group consisting of magnesium chloride and calcium chloride and acting upon this addition compound with water or moisture.

6. The process for combating pests in enclosed spaces which comprises introducing into the closed space a preparation containing an addition compound of methylformate with an anhydrous magnesium chloride and acting upon this addition compound with water or moisture.

7. The process for combating pests in enclosed spaces which comprises introducing into the closed space the compound of the formula $MgCl_2 \cdot 2HCOOCH_3$ and acting upon this addition compound with water or moisture.

8. The process for combating pests in enclosed spaces which comprises introducing into the closed space the compound of the formula $CaCl_2 \cdot 2HCOOCH_3$ and acting upon this addition compound with water or moisture.

9. The process for combating pests in corn which comprises mixing the corn having its natural moisture with a preparation containing an addition compound of methylformate with anhydrous calcium chloride.

KARL BRODERSEN.
MATTHIAS QUAEDVLIEG.